(12) United States Patent
Dungerpuria

(10) Patent No.: US 12,197,194 B2
(45) Date of Patent: Jan. 14, 2025

(54) METHOD AND SYSTEM FOR OPTIMALLY FITTING SHAPES IN 2-DIMENSIONAL (2D) SHEETS

(71) Applicant: HCL Technologies Limited, New Delhi (IN)

(72) Inventor: Yash Kumar Dungerpuria, Navi Mumbai (IN)

(73) Assignee: HCL Technologies Limited, New Delhi (IN)

( * ) Notice: Subject to any disclaimer, the term of this patent is extended or adjusted under 35 U.S.C. 154(b) by 271 days.

(21) Appl. No.: 17/572,757

(22) Filed: Jan. 11, 2022

(65) Prior Publication Data

US 2023/0168664 A1   Jun. 1, 2023

(51) Int. Cl.
*G05B 19/418* (2006.01)

(52) U.S. Cl.
CPC ... *G05B 19/41865* (2013.01); *G05B 19/4183* (2013.01)

(58) Field of Classification Search
USPC ........................................................ 700/117
See application file for complete search history.

(56) References Cited

U.S. PATENT DOCUMENTS

| | | | |
|---|---|---|---|
| 3,803,960 A | 4/1974 | Pearl et al. | |
| 4,210,041 A | 7/1980 | Mitman | |
| 6,980,934 B1 * | 12/2005 | Sadovnik | G06F 30/13 |
| | | | 206/505 |
| 9,575,487 B2 * | 2/2017 | Lundy | G05B 19/41865 |
| 2005/0122346 A1 * | 6/2005 | Horn | G06F 30/00 |
| | | | 345/629 |
| 2015/0346922 A1 * | 12/2015 | Robertson | G06F 17/11 |
| | | | 715/765 |
| 2015/0379161 A1 * | 12/2015 | Jones | G06F 30/00 |
| | | | 703/1 |

(Continued)

FOREIGN PATENT DOCUMENTS

| | | |
|---|---|---|
| CN | 107392998 A | 11/2017 |
| EP | 1053084 A1 | 11/2000 |

OTHER PUBLICATIONS

Dighe et al., WO-9726607-A1 (Year: 1997).*

(Continued)

*Primary Examiner* — Hien D Khuu
(74) *Attorney, Agent, or Firm* — Kendal M. Sheets

(57) ABSTRACT

This disclosure relates to method and system for optimally fitting shapes in a 2-Dimensional (2D) sheet. The method includes receiving discretized geometric data corresponding to a 2D shape; generating a pair of copies of the 2D shape including a first copy and a second copy using the discretized geometric data; determining an optimal arrangement of the first copy and the second copy on the 2D sheet to obtain an optimally arranged pair; generating first copy of the optimally arranged pair and second copy of the optimally arranged pair; determining a pair combination with a minimum distance between the first copy and the second copy; calculating a maximum number of repetitions possible for the pair combination on the 2D sheet based on sheet dimensions and a set of pair combination parameters; and identifying an optimal pair combination from a plurality of pair combinations based on the maximum number of repetitions.

18 Claims, 6 Drawing Sheets

(56) References Cited

U.S. PATENT DOCUMENTS

2016/0132049 A1* 5/2016 Ben-Bassat ...... G05B 19/41865
                                                    700/100
2017/0203457 A1* 7/2017 Goulimis ............. G05B 19/402
2018/0173201 A1   6/2018 Norberg Ohlsson
2020/0156137 A1* 5/2020 Zalduegui .............. B23K 26/38

OTHER PUBLICATIONS

T. F. Lam, W. S. Sze and S. T. Tan, Nesting of Complex Sheet Metal Parts, Article in Computer-Aided Design and Applications •Jan. 2007, pp. 169-179, vol. 4.

* cited by examiner

METHOD AND SYSTEM FOR OPTIMALLY FITTING SHAPES IN 2-DIMENSIONAL (2D) SHEETS

TECHNICAL FIELD

This disclosure relates generally to 2-Dimensional (2D) nesting, and more particularly to method and system for optimally fitting shapes in a 2D sheet.

BACKGROUND

In the present scenario, manufacturing industries manufacture various 3D and 2D objects. While manufacturing 2D objects, shapes of the objects are placed on larger 2D sheets. The 2D sheets may be made of metal, leather, textile, paper, glass, or the like. The 2D sheets and the 2D objects may be rectangular or non-rectangular in shape. The manufacturing industries require minimization of raw material usage. Thus, packing algorithms used by the manufacturing industries should be efficient to material consumption. In the present state of art, nesting problems encountered by the manufacturing industries may include multiple copies of a single geometric shape or multiple copies of multiple geometric shapes to be placed on the 2D sheet.

Conventional techniques estimate efficiency based on parameters provided for part geometry alone such as, geometry, orientation, etc. Further, the convention methods use certain standard pairing techniques for a given combination of orientations. The conventional techniques fail to provide for methods to optimally fit non-rectangular 2D shapes on a rectangular 2D sheet. There is, therefore, a need in the present state of art for techniques to optimally fit shapes on a 2D sheet to minimize resource wastage.

SUMMARY

In one embodiment, a method for optimally fitting shapes in a 2-Dimensional (2D) sheet is disclosed. In one example, the method includes receiving discretized geometric data corresponding to a 2D shape of a part. The discretized geometric data includes a plurality of pixels corresponding to the 2D shape. The method further includes generating a pair of copies of the 2D shape including a first copy of the 2D shape at an initial first copy orientation and a second copy of the 2D shape at an initial second copy orientation using the discretized geometric data. The initial first copy orientation is one of a plurality of permissible first copy orientations and the initial second copy orientation is one of a plurality of permissible second copy orientations. For each of the plurality of permissible first copy orientations and each of the plurality of permissible second copy orientations, the method further includes determining an optimal arrangement of the first copy and the second copy on the 2D sheet to obtain an optimally arranged pair. The optimally arranged pair includes the first copy at a final first copy orientation and the second copy at a final second copy orientation. The final first copy orientation is one of a plurality of permissible first copy orientations and the final second copy orientation is one of a plurality of permissible second copy orientations. For each of a plurality of optimally arranged pairs, the method further includes generating a first copy of the pair and a second copy of the pair. The first copy of the pair is located at an initial distance apart from the second copy of the pair. For each of a plurality of optimally arranged pairs, the method further includes determining a pair combination with a minimum distance between the first copy of the pair and the second copy of the pair. The minimum distance includes a minimum part-to-part distance. For each of a plurality of optimally arranged pairs, the method further includes calculating a maximum number of repetitions possible for the pair combination on the 2D sheet based on sheet dimensions and a set of pair combination parameters. For each of a plurality of optimally arranged pairs, the method further includes identifying an optimal pair combination from a plurality of pair combinations based on the maximum number of repetitions possible on the 2D sheet.

In one embodiment, a system for optimally fitting shapes in a 2D sheet is disclosed. In one example, the system includes a processor and a computer-readable medium communicatively coupled to the processor. The computer-readable medium store processor-executable instructions, which, on execution, cause the processor to receive discretized geometric data corresponding to a 2D shape of a part. The discretized geometric data includes a plurality of pixels corresponding to the 2D shape. The processor-executable instructions, on execution, further cause the processor to generate a pair of copies of the 2D shape including a first copy of the 2D shape at an initial first copy orientation and a second copy of the 2D shape at an initial second copy orientation using the discretized geometric data. The initial first copy orientation is one of a plurality of permissible first copy orientations and the initial second copy orientation is one of a plurality of permissible second copy orientations. For each of the plurality of permissible first copy orientations and each of the plurality of permissible second copy orientations, the processor-executable instructions, on execution, further cause the processor to determine an optimal arrangement of the first copy and the second copy on the 2D sheet to obtain an optimally arranged pair. The optimally arranged pair includes the first copy at a final first copy orientation and the second copy at a final second copy orientation. The final first copy orientation is one of a plurality of permissible first copy orientations and the final second copy orientation is one of a plurality of permissible second copy orientations. For each of a plurality of optimally arranged pairs, the processor-executable instructions, on execution, further cause the processor to generate a first copy of the pair and a second copy of the pair. The first copy of the pair is located at an initial distance apart from the second copy of the pair. For each of a plurality of optimally arranged pairs, the processor-executable instructions, on execution, further cause the processor to determine a pair combination with a minimum distance between the first copy of the pair and the second copy of the pair. The minimum distance includes a minimum part-to-part distance. For each of a plurality of optimally arranged pairs, the processor-executable instructions, on execution, further cause the processor to calculate a maximum number of repetitions possible for the pair combination on the 2D sheet based on sheet dimensions and a set of pair combination parameters. For each of a plurality of optimally arranged pairs, the processor-executable instructions, on execution, further cause the processor to identify an optimal pair combination from a plurality of pair combinations based on the maximum number of repetitions possible on the 2D sheet.

In one embodiment, a non-transitory computer-readable medium storing computer-executable instructions for optimally fitting shapes in a 2D sheet is disclosed. In one example, the stored instructions, when executed by a processor, cause the processor to perform operations including receiving discretized geometric data corresponding to a 2D shape of a part. The discretized geometric data includes a plurality of pixels corresponding to the 2D shape. The operations further include generating a pair of copies of the 2D shape including a first copy of the 2D shape at an initial first copy orientation and a second copy of the 2D shape at an initial second copy orientation using the discretized geometric data. The initial first copy orientation is one of a plurality of permissible first copy orientations and the initial second copy orientation is one of a plurality of permissible second copy orientations. For each of the plurality of permissible first copy orientations and each of the plurality of permissible second copy orientations, the operations further include determining an optimal arrangement of the first copy and the second copy on the 2D sheet to obtain an optimally arranged pair. The optimally arranged pair includes the first copy at a final first copy orientation and the second copy at a final second copy orientation. The final first copy orientation is one of a plurality of permissible first copy orientations and the final second copy orientation is one of a plurality of permissible second copy orientations. For each of a plurality of optimally arranged pairs, the operations further include generating a first copy of the pair and a second copy of the pair. The first copy of the pair is located at an initial distance apart from the second copy of the pair. For each of a plurality of optimally arranged pairs, the operations further include determining a pair combination with a minimum distance between the first copy of the pair and the second copy of the pair. The minimum distance includes a minimum part-to-part distance. For each of a plurality of optimally arranged pairs, the operations further include calculating a maximum number of repetitions possible for the pair combination on the 2D sheet based on sheet dimensions and a set of pair combination parameters. For each of a plurality of optimally arranged pairs, the operations further include identifying an optimal pair combination from a plurality of pair combinations based on the maximum number of repetitions possible on the 2D sheet.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
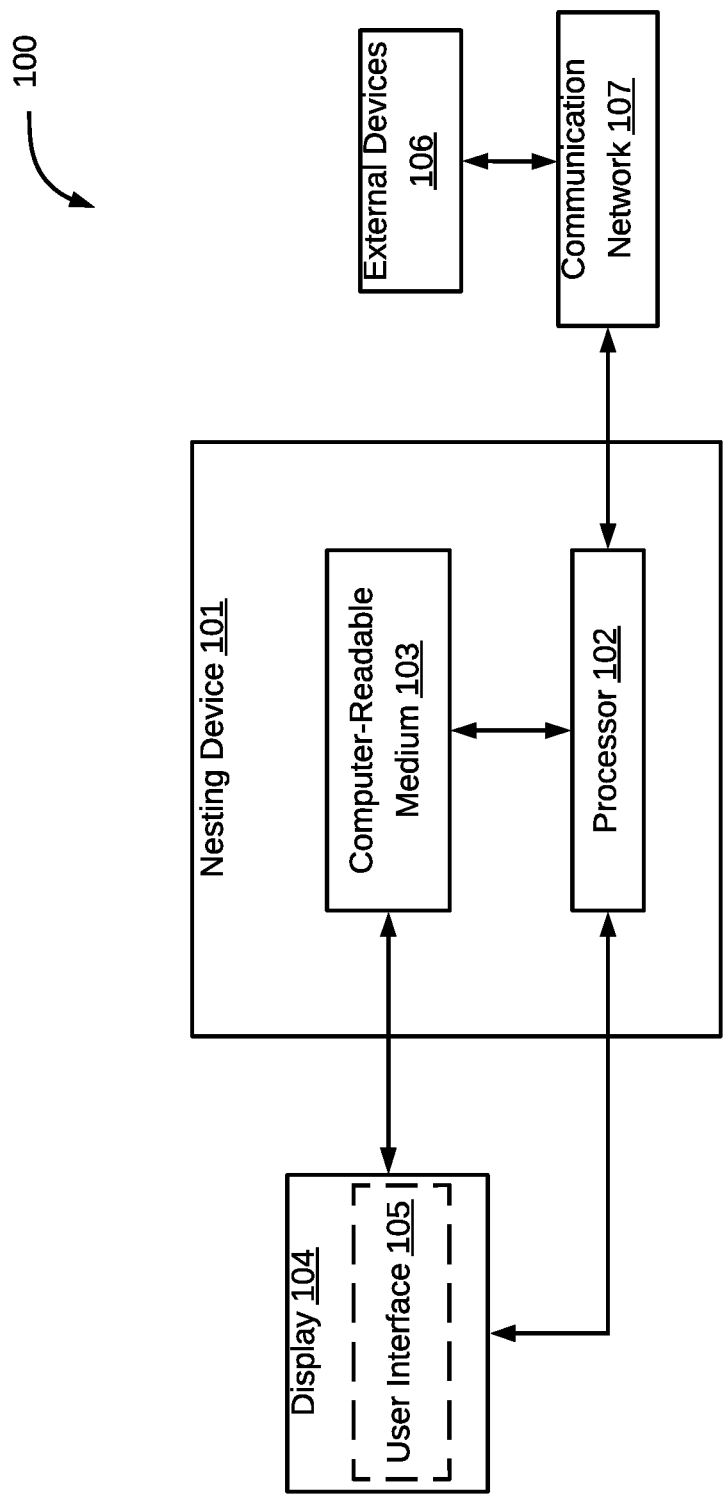
FIG. 1 is a block diagram of an exemplary system for optimally fitting shapes in a 2-Dimensional (2D) sheet, in accordance with some embodiments of the present disclosure.

Referring now to FIG. 1, an exemplary system 100 for optimally fitting shapes in a 2-Dimensional (2D) sheet is illustrated, in accordance with some embodiments of the present disclosure. The system 100 may implement a nesting device 101 (for example, server, desktop, laptop, notebook, netbook, tablet, smartphone, mobile phone, or any other computing device), in accordance with some embodiments of the present disclosure. The nesting device 101 may optimally fit a 2D shape of a part in a 2D sheet from an optimally arranged pair of copies of the 2D shape. The 2D sheet may be made of a raw material (for example, metal, leather, textile, paper, glass, or the like). In an embodiment, the 2D sheet may be of a rectangular shape. The 2D shape of the part may be rectangular or non-rectangular.

As will be described in greater detail in conjunction with FIGS. 2-4, the nesting device may receive discretized geometric data corresponding to a 2D shape of a part. The discretized geometric data includes a plurality of pixels corresponding to the 2D shape. The nesting device may further generate a pair of copies of the 2D shape including a first copy of the 2D shape at an initial first copy orientation and a second copy of the 2D shape at an initial second copy orientation using the discretized geometric data. The initial first copy orientation is one of a plurality of permissible first copy orientations and the initial second copy orientation is one of a plurality of permissible second copy orientations. For each of the plurality of permissible first copy orientations and each of the plurality of permissible second copy orientations, the nesting device may further determine an optimal arrangement of the first copy and the second copy on the 2D sheet to obtain an optimally arranged pair. The optimally arranged pair includes the first copy at a final first copy orientation and the second copy at a final second copy orientation. The final first copy orientation is one of a plurality of permissible first copy orientations and the final second copy orientation is one of a plurality of permissible second copy orientations. For each of a plurality of optimally arranged pairs, the nesting device may further generate a first copy of the pair and a second copy of the pair. The first copy of the pair is located at an initial distance apart from the second copy of the pair. For each of a plurality of optimally arranged pairs, the nesting device may further determine a pair combination with a minimum distance between the first copy of the pair and the second copy of the pair. The minimum distance includes a minimum part-to-part distance. For each of a plurality of optimally arranged pairs, the nesting device may further calculate a maximum number of repetitions possible for the pair combination on the 2D sheet based on sheet dimensions and a set of pair combination parameters. For each of a plurality of optimally arranged pairs, the nesting device may further identify an optimal pair combination from a plurality of pair combinations based on the maximum number of repetitions possible on the 2D sheet.

In some embodiments, the nesting device 101 may include one or more processors 102 and a computer-readable medium 103 (for example, a memory). Further, the computer-readable storage medium 103 may store instructions that, when executed by the one or more processors 102, cause the one or more processors 102 to optimally fit shapes in a 2D sheet, in accordance with aspects of the present disclosure. The computer-readable storage medium 103 may also store various data (for example, discretized geometric data, pair of copies of the 2D shape, permissible orientation data, minimum distance data, maximum number of repetitions possible, and the like) that may be captured, processed, and/or required by the system 100.

The system 100 may further include a display 104. The system 100 may interact with a user via a user interface 105 accessible via the display 104. The system 100 may also include one or more external devices 106. In some embodiments, the PII tracking device 101 may interact with the one or more external devices 106 over a communication network 107 for sending or receiving various data. The external devices 106 may include, but may not be limited to, a remote server, a digital device, or another computing system.

Figure 2:
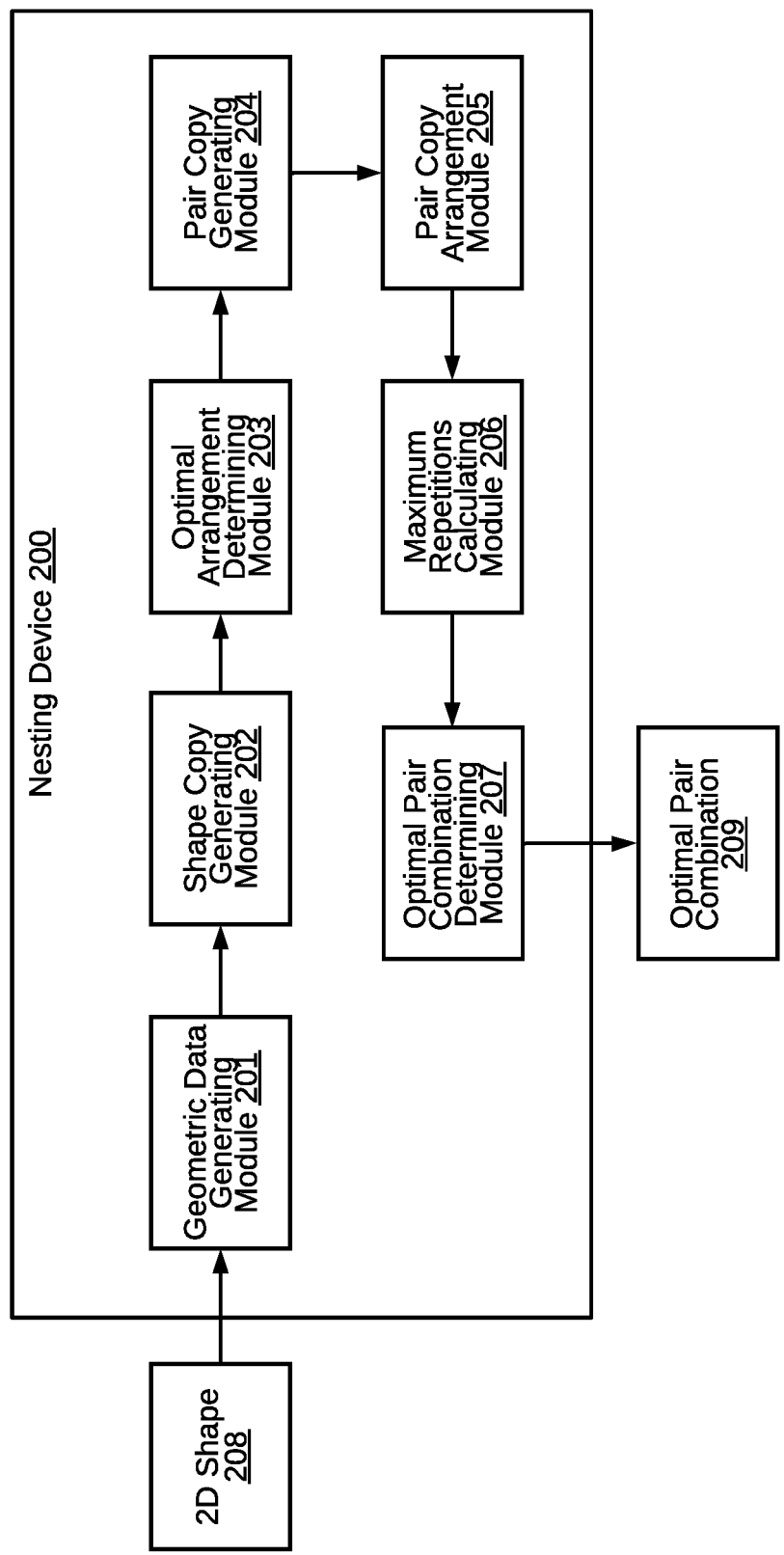
FIG. 2 illustrates a functional block diagram of an exemplary system for optimally fitting shapes in a 2D sheet, in accordance with some embodiments of the present disclosure.

Referring now to FIG. 2, functional block diagram of an exemplary system 200 for optimally fitting shapes in a 2D sheet is illustrated, in accordance with some embodiments of the present disclosure. In an embodiment, the system 200 is analogous to the nesting device 101 of the system 100. The system 200 includes a geometric data generating module 201, a shape copy generating module 202, an optimal arrangement determining module 203, a pair copy generating module 204, a pair copy arrangement module 205, a maximum repetitions calculating module 206, and an optimal pair combination determining module 207.

The geometric data generating module 201 receives a 2D shape 208 of a part. Further, the geometric data generating module 201 generates the discretized geometric data from the 2D shape 208 of the part. In some embodiments, the discretized geometric data includes a plurality of pixels corresponding to the 2D shape 208. Further, the geometric data generating module 201 sends the discretized geometric data to the shape copy generating module 202. The shape copy generating module 202 generates a pair of copies of the 2D shape 208 including a first copy of the 2D shape 208 at an initial first copy orientation and a second copy of the 2D shape 208 at an initial second copy orientation using the discretized geometric data. It should be noted that the initial first copy orientation is one of a plurality of permissible first copy orientations and the initial second copy orientation is one of a plurality of permissible second copy orientations. Further, the shape copy generating module 202 sends the pair of copies of the 2D shape 208 to the optimal arrangement determining module 203.

For each of the plurality of permissible first copy orientations and each of the plurality of permissible second copy orientations, the optimal arrangement determining module 203 determines an optimal arrangement of the first copy and the second copy on the 2D sheet to obtain an optimally arranged pair. The optimally arranged pair includes the first copy at a final first copy orientation and the second copy at a final second copy orientation. It may be noted that the final first copy orientation is one of a plurality of permissible first copy orientations and the final second copy orientation is one of a plurality of permissible second copy orientations.

In an embodiment, for each of the plurality of permissible second copy orientations of the second copy, the optimal arrangement determining module 203 revolves the second copy around the first copy based on a constant predefined rotational variable at discrete predefined intervals. The first copy is at the initial first copy orientation. Similarly, the optimal arrangement determining module 203 generates a plurality of optimally arranged pairs corresponding to the plurality of permissible first copy orientations and the plurality of permissible second copy orientations. Further, the optimal arrangement determining module 203 sends the plurality of optimally arranged pairs to the pair copy generating module 204.

For each of a plurality of optimally arranged pairs, the pair copy generating module 204 generates a first copy of the pair and a second copy of the pair. The first copy of the pair is located at an initial distance apart from the second copy of the pair. It should be noted that the initial distance between the first copy of the pair and the second copy of the pair includes an initial horizontal distance and an initial vertical distance. Further, the pair copy generating module 204 sends the first copy of the pair and the second copy of the pair to the pair copy arrangement module 205.

In an embodiment, for each of the plurality of permissible second copy orientations of the second copy, the pair copy arrangement module 205 identifies at least one intersecting region between the first copy and the second copy in the 2D sheet. For each of a plurality of optimally arranged pairs, the pair copy arrangement module 205 determines a pair combination with a minimum distance between the first copy of the pair and the second copy of the pair. It should be noted that the minimum distance includes a minimum part-to-part distance. The pair copy arrangement module 205 reduces the initial horizontal distance between the first copy of the pair and the second copy of the pair by predefined horizontal distance intervals to obtain a minimum part-to-part distance between the first copy of the pair and the second copy of the pair. The first copy of the pair is not intersecting with the second copy of the pair at the minimum part-to-part distance.

Further, the pair copy arrangement module 205 reduces the initial vertical distance between the first copy of the pair and the second copy of the pair by predefined vertical distance intervals to obtain a minimum part-to-part distance between the first copy of the pair and the second copy of the pair. The first copy of the pair is not intersecting with the second copy of the pair at the minimum part-to-part distance. Further, the pair copy arrangement module 205 determines the minimum distance between the first copy of the pair and the second copy of the pair based on the minimum part-to-part distance. Further, the pair copy arrangement module 205 sends the pair combination with the minimum distance to the maximum repetitions calculating module 206.

For each of a plurality of optimally arranged pairs, the maximum repetitions calculating module 206 calculates a maximum number of repetitions possible for the pair combination on the 2D sheet based on sheet dimensions and a set of pair combination parameters. By way of an example, the set of pair combination parameters includes geometry of the 2D shape 208, orientation of the first copy and the second copy in the pair, and the minimum part-to-part distance. Further, the maximum repetitions calculating module 206 sends the maximum number of repetitions to the optimal pair combination determining module 207.

For each of a plurality of optimally arranged pairs, the optimal pair combination determining module 207 identifies an optimal pair combination from a plurality of pair combinations based on the maximum number of repetitions possible on the 2D sheet. For each of at least two optimal pair combinations with identical maximum number of repetitions possible, the optimal pair combination determining module 207 calculates a continuous remnant on the 2D sheet for an optimal pair combination with maximum number of repetitions possible. Further, the optimal pair combination determining module 207 selects an optimal pair combination 209 from the at least two optimal pair combinations based on the continuous remnant on the 2D sheet. The continuous remnant on the 2D sheet for the selected optimal pair combination 209 is highest among the at least two optimal pair combinations. Further, the optimal pair combination 209 may be replicated on the 2D sheet at the maximum number of repetitions possible, optimally fitting the shapes in the 2D sheet.

It should be noted that all such aforementioned modules 201-210 may be represented as a single module or a combination of different modules. Further, as will be appreciated by those skilled in the art, each of the modules 201-210 may reside, in whole or in parts, on one device or multiple devices in communication with each other. In some embodiments, each of the modules 201-210 may be implemented as dedicated hardware circuit comprising custom application-specific integrated circuit (ASIC) or gate arrays, off-the-shelf semiconductors such as logic chips, transistors, or other discrete components. Each of the modules 201-210 may also be implemented in a programmable hardware device such as a field programmable gate array (FPGA), programmable array logic, programmable logic device, and so forth. Alternatively, each of the modules 201-210 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for optimally fitting shapes in a 2D sheet. For example, the exemplary system 100 and the associated nesting device 101 may optimally fit shapes in a 2D sheet by the processes discussed herein. In particular, as will be appreciated by those of ordinary skill in the art, control logic and/or automated routines for performing the techniques and steps described herein may be implemented by the system 100 and the associated nesting device 101 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3A:
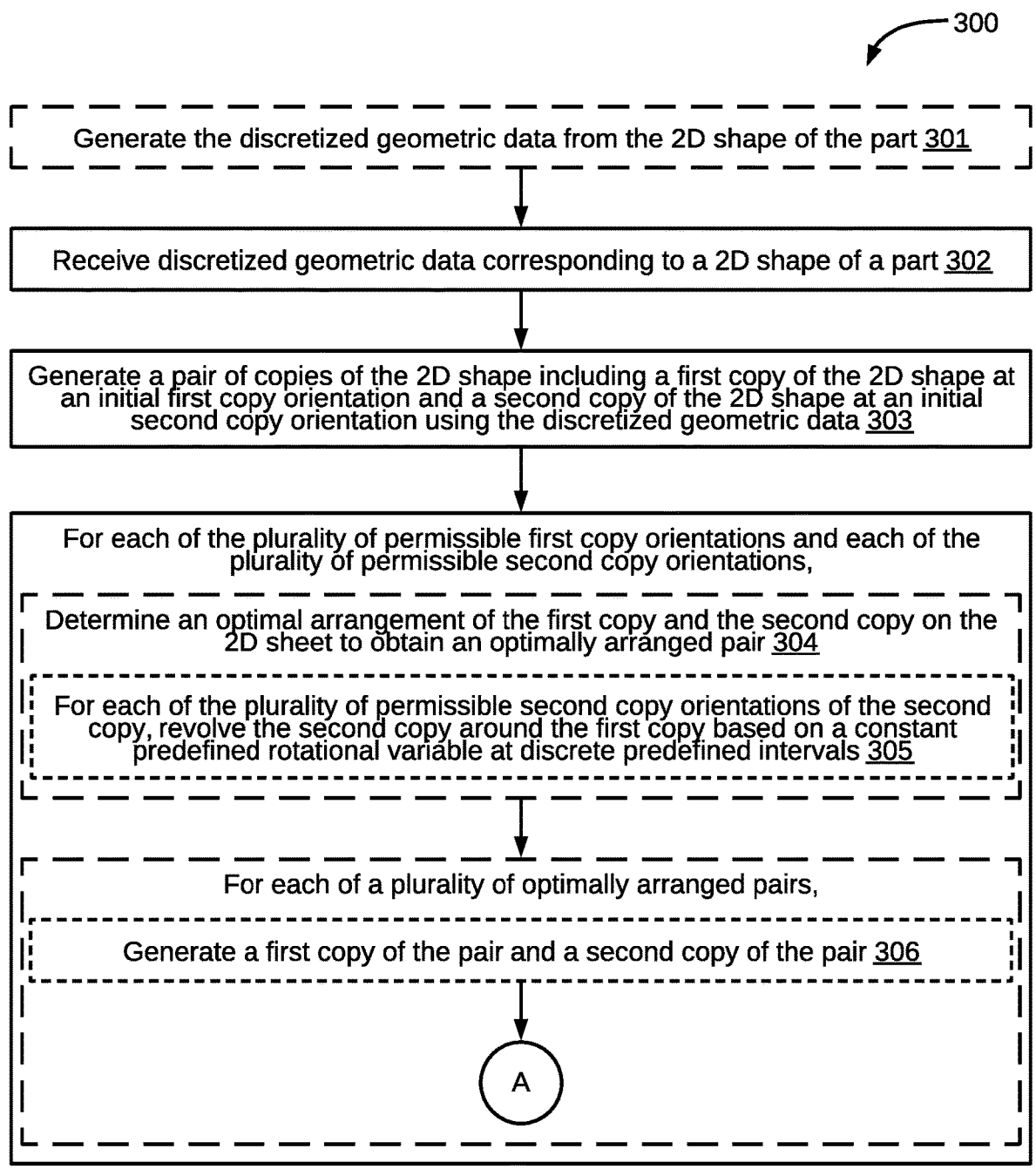
FIGS. 3A and 3B illustrate a flow diagram of an exemplary process for optimally fitting shapes in a 2D sheet, in accordance with some embodiments of the present disclosure.
Figure 3B:
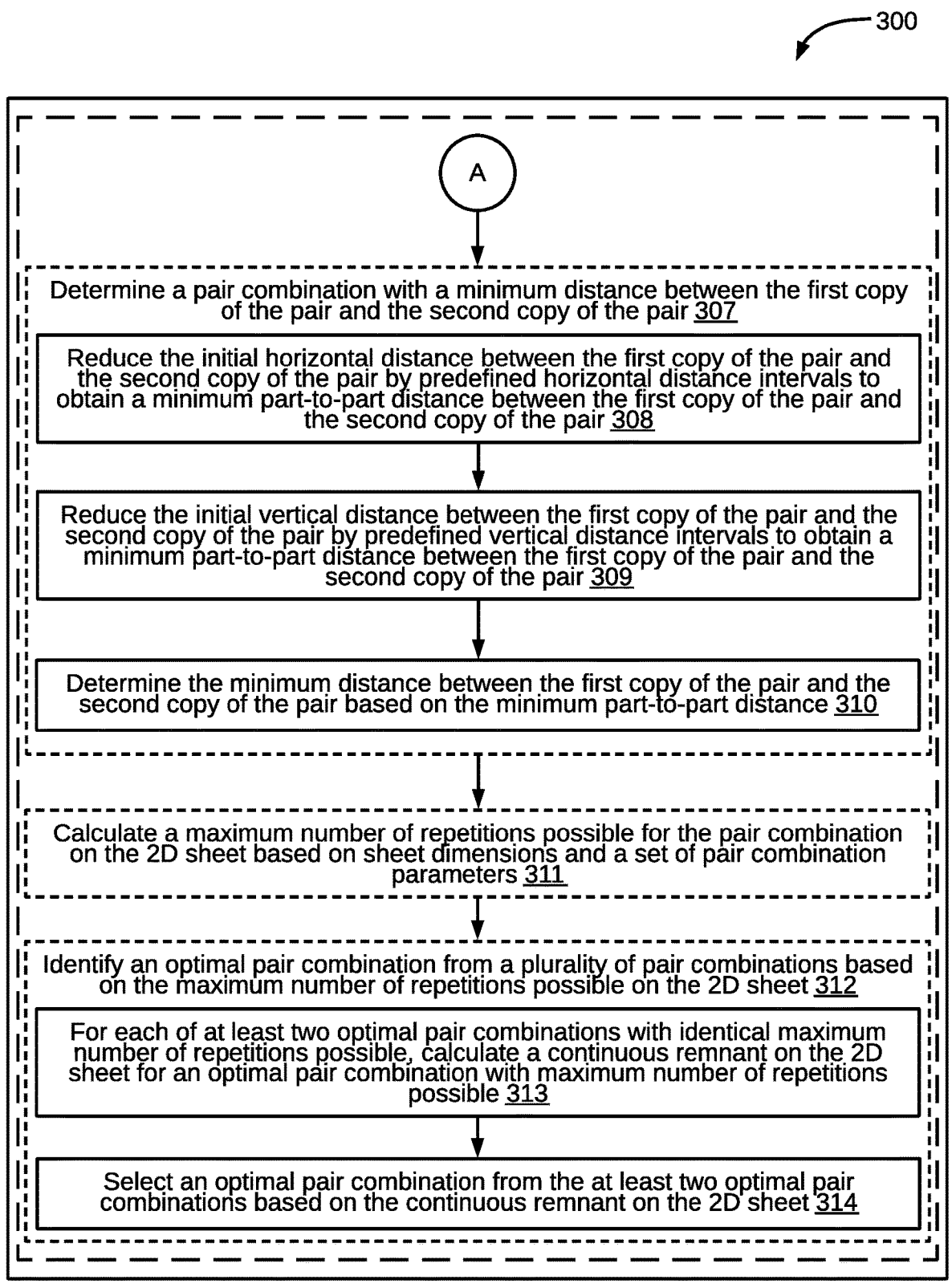

Referring now to FIGS. 3A and 3B, an exemplary process 300 for optimally fitting shapes in a 2D sheet is depicted via a flowchart, in accordance with some embodiments of the present disclosure. In an embodiment, the process 300 is implemented by the nesting device 101 of the system 100. The process 300 includes generating discretized geometric data from the 2D shape (for example, the 2D shape 208) of the part, at step 301. The discretized geometric data includes a plurality of pixels corresponding to the 2D shape. Further, the process 300 includes receiving the discretized geometric data corresponding to the 2D shape of the part, at step 302.

Further, the process 300 includes generating a pair of copies of the 2D shape including a first copy of the 2D shape at an initial first copy orientation and a second copy of the 2D shape at an initial second copy orientation using the discretized geometric data, at step 303. The initial first copy orientation is one of a plurality of permissible first copy orientations and the initial second copy orientation is one of a plurality of permissible second copy orientations. By way of an example, the geometric data generating module 201 generates the discretized geometric data from the 2D shape 208 of the part. Further, the geometric data generating module 201 sends the discretized geometric data to the shape copy generating module 202. The shape copy generating module 202 generates a pair of copies of the 2D shape 208 including a first copy of the 2D shape 208 at an initial first copy orientation and a second copy of the 2D shape 208 at an initial second copy orientation using the discretized geometric data.

Further, for each of the plurality of permissible first copy orientations and each of the plurality of permissible second copy orientations, the process 300 includes determining an optimal arrangement of the first copy and the second copy on the 2D sheet to obtain an optimally arranged pair, at step 304. The optimally arranged pair includes the first copy at a final first copy orientation and the second copy at a final second copy orientation. The final first copy orientation is one of a plurality of permissible first copy orientations and the final second copy orientation is one of a plurality of permissible second copy orientations. It should be noted that the step 304 may be performed in iteration for each of the plurality of permissible first copy orientations and each of the plurality of permissible second copy orientations to obtain a plurality of optimally arranged pairs.

Further, for each of the plurality of permissible second copy orientations of the second copy, the step 304 of the process 300 includes revolving the second copy around the first copy based on a constant predefined rotational variable at discrete predefined intervals, at step 305. The first copy is at the initial first copy orientation. Further, for each of the plurality of optimally arranged pairs, the process 300 includes generating a first copy of the pair and a second copy of the pair, at step 306. The first copy of the pair is located at an initial distance apart from the second copy of the pair. In continuation of the example above, the shape copy generating module 202 sends the pair of copies of the 2D shape 208 to the optimal arrangement determining module 203. For each of the plurality of permissible first copy orientations and each of the plurality of permissible second copy orientations, the optimal arrangement determining module 203 determines an optimal arrangement of the first copy and the second copy on the 2D sheet to obtain an optimally arranged pair. The optimally arranged pair includes the first copy at a final first copy orientation and the second copy at a final second copy orientation. In an embodiment, for each of the plurality of permissible second copy orientations of the second copy, the optimal arrangement determining module 203 revolves the second copy around the first copy based on a constant predefined rotational variable at discrete predefined intervals to obtain an optimally arranged pair. Further, the optimal arrangement determining module 203 sends the plurality of optimally arranged pairs to the pair copy generating module 204. For each of a plurality of optimally arranged pairs, the pair copy generating module 204 generates a first copy of the pair and a second copy of the pair. The first copy of the pair is located at an initial distance apart from the second copy of the pair.

In an embodiment, for each of the plurality of permissible second copy orientations of the second copy, at least one intersecting region between the first copy and the second copy may be identified in the 2D sheet. Further, for each of the plurality of optimally arranged pairs, the process 300 includes determining a pair combination with a minimum distance between the first copy of the pair and the second copy of the pair, at step 307. The minimum distance includes a minimum part-to-part distance. The initial distance between the first copy of the pair and the second copy of the pair includes an initial horizontal distance and an initial vertical distance.

Further, the step 307 of the process 300 includes reducing the initial horizontal distance between the first copy of the pair and the second copy of the pair by predefined horizontal distance intervals to obtain a minimum part-to-part distance between the first copy of the pair and the second copy of the pair, at step 308. The first copy of the pair is not intersecting with the second copy of the pair at the minimum part-to-part distance. Further, the step 307 of the process 300 includes reducing the initial vertical distance between the first copy of the pair and the second copy of the pair by predefined vertical distance intervals to obtain a minimum part-to-part distance between the first copy of the pair and the second copy of the pair, at step 309. The first copy of the pair is not intersecting with the second copy of the pair at the minimum part-to-part distance.

Further, the step 307 of the process 300 includes determining the minimum distance between the first copy of the pair and the second copy of the pair based on the minimum part-to-part distance, at step 310. In continuation of the example above, the pair copy generating module 204 sends the first copy of the pair and the second copy of the pair to the pair copy arrangement module 205. For each of a plurality of optimally arranged pairs, the pair copy arrangement module 205 determines a pair combination with a minimum distance between the first copy of the pair and the second copy of the pair. The pair copy arrangement module 205 reduces the initial horizontal distance between the first copy of the pair and the second copy of the pair by predefined horizontal distance intervals to obtain a minimum part-to-part distance between the first copy of the pair and the second copy of the pair. Further, the pair copy arrangement module 205 reduces the initial vertical distance between the first copy of the pair and the second copy of the pair by predefined vertical distance intervals to obtain a minimum part-to-part distance between the first copy of the pair and the second copy of the pair. Further, the pair copy arrangement module 205 determines the minimum distance between the first copy of the pair and the second copy of the pair based on the minimum part-to-part distance.

Further, the process 300 includes calculating a maximum number of repetitions possible for the pair combination on the 2D sheet based on sheet dimensions and a set of pair combination parameters, at step 311. By way of an example, the set of pair combination parameters includes geometry of the 2D shape, orientation of the first copy and the second copy in the pair, and the minimum part-to-part distance. Further, the process 300 includes identifying an optimal pair combination from a plurality of pair combinations based on the maximum number of repetitions possible on the 2D sheet, at step 312. Further, for each of at least two optimal pair combinations with identical maximum number of repetitions possible, the step 312 of the process 300 includes calculating a continuous remnant on the 2D sheet for an optimal pair combination with maximum number of repetitions possible, at step 313.

Further, the step 312 of the process 300 includes selecting an optimal pair combination from the at least two optimal pair combinations based on the continuous remnant on the 2D sheet, at step 314. The continuous remnant on the 2D sheet for the selected optimal pair combination is highest among the at least two optimal pair combinations. In continuation of the example above, the pair copy arrangement module 205 sends the pair combination with the minimum distance to the maximum repetitions calculating module 206. For each of a plurality of optimally arranged pairs, the maximum repetitions calculating module 206 calculates a maximum number of repetitions possible for the pair combination on the 2D sheet based on sheet dimensions and a set of pair combination parameters. Further, the maximum repetitions calculating module 206 sends the maximum number of repetitions to the optimal pair combination determining module 207. For each of a plurality of optimally arranged pairs, the optimal pair combination determining module 207 identifies an optimal pair combination from a plurality of pair combinations based on the maximum number of repetitions possible on the 2D sheet. When two or more optimal pair combinations are identified with identical maximum number of repetitions possible, the optimal pair combination determining module 207 calculates a continuous remnant on the 2D sheet for each of the two or more optimal pair combinations with identical maximum number of repetitions possible. Further, the optimal pair combination determining module 207 selects an optimal pair combination 209 from the two or more optimal pair combinations based on the continuous remnant on the 2D sheet. The continuous remnant on the 2D sheet for the selected optimal pair combination 209 is highest among the at least two optimal pair combinations. Further, the optimal pair combination 209 may be replicated on the 2D sheet at the maximum number of repetitions possible, optimally fitting the shapes in the 2D sheet.

Figure 4:
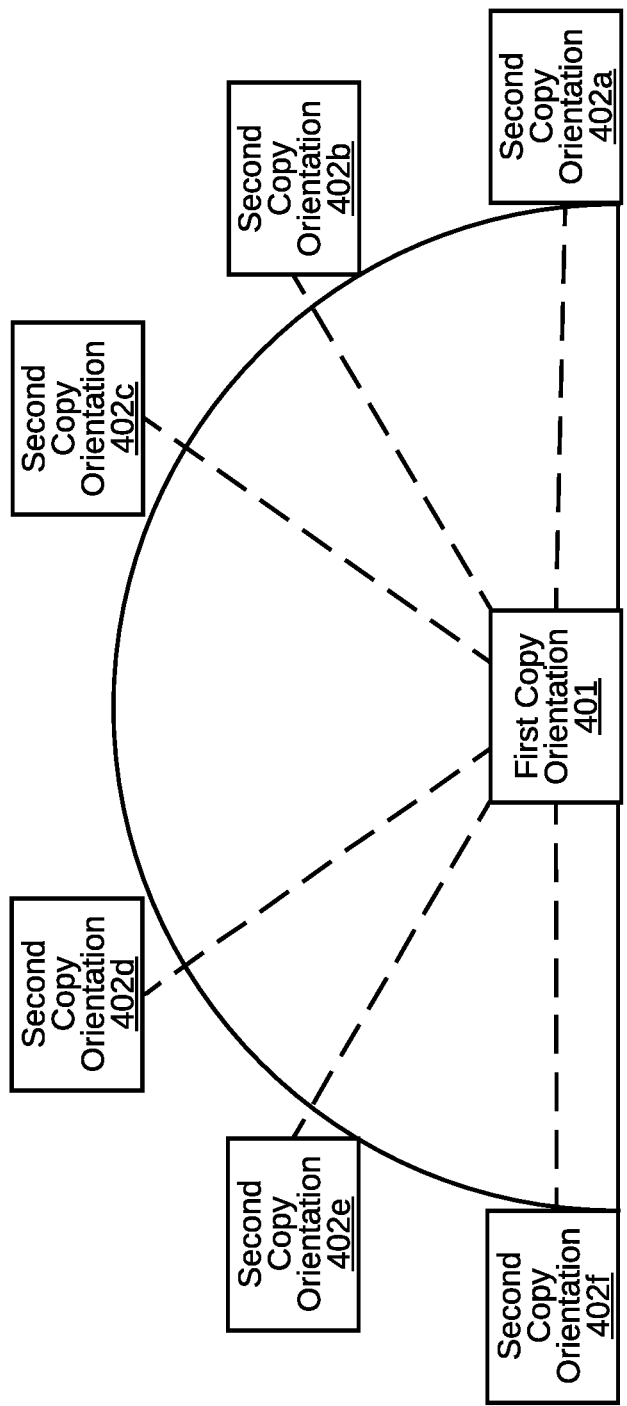
FIG. 4 illustrates determination of an optimally arranged pair of copies of a 2D shape of a part, in accordance with some embodiments of the present disclosure.

Referring now to FIG. 4, determination of an optimally arranged pair of copies of a 2D shape of a part is illustrated, in accordance with some embodiments of the present disclosure. The shape copy generating module 202 generates a pair of copies of the 2D shape including a first copy of the 2D shape at an initial first copy orientation 401 and a second copy of the 2D shape at an initial second copy orientation 402a using the discretized geometric data. It should be noted that the initial first copy orientation is one of a plurality of permissible first copy orientations and the initial second copy orientation is one of a plurality of permissible second copy orientations. Further, the shape copy generating module 202 sends the pair of copies of the 2D shape to the optimal arrangement determining module 203.

Further, for each of the plurality of permissible second copy orientations of the second copy, the optimal arrangement determining module 203 revolves the second copy around the first copy based on a constant predefined rotational variable at discrete predefined intervals. The first copy is fixed at the initial first copy orientation 401 whereas the second copy is revolved around the first copy at discrete predefined intervals. By way of an example, second copy orientation at each of the discrete predefined intervals is the initial second copy orientation 402a, second copy orientation 402b, second copy orientation 402c, second copy orientation 402d, second copy orientation 402e, and second copy orientation 402f.

Further, the optimal arrangement determining module 203 determines an optimal arrangement of the first copy and the second copy on the 2D sheet to obtain an optimally arranged pair. For example, the optimally arranged pair may include the first copy at the initial first copy orientation 401 and the second copy at the second copy orientation 402*d*.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
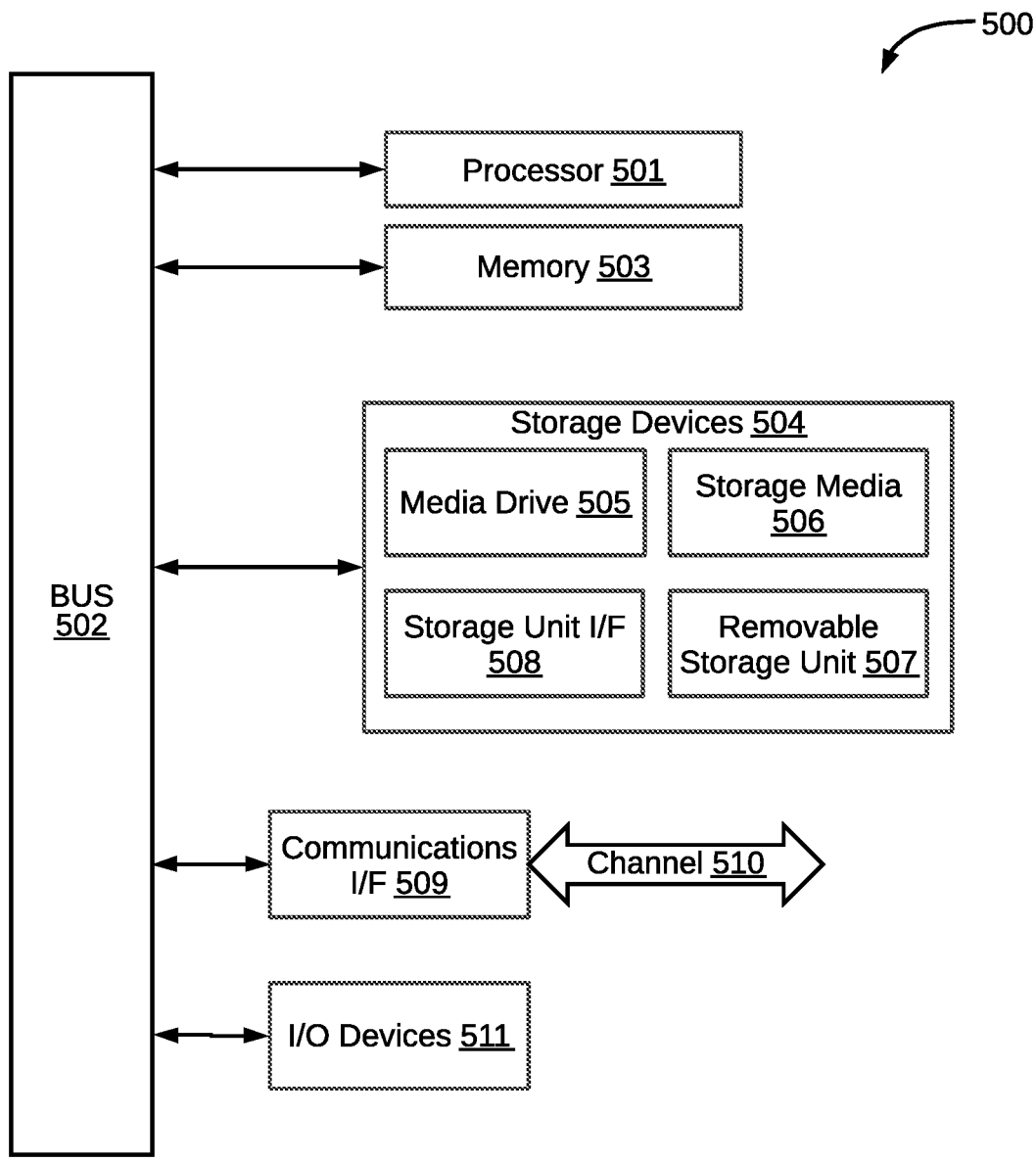
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, an exemplary computing system 500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 500 may represent, for example, a user device such as a desktop, a laptop, a mobile phone, personal entertainment device, DVR, and so on, or any other type of special or general-purpose computing device as may be desirable or appropriate for a given application or environment. The computing system 500 may include one or more processors, such as a processor 501 that may be implemented using a general or special purpose processing engine such as, for example, a microprocessor, microcontroller or other control logic. In this example, the processor 501 is connected to a bus 502 or other communication medium. In some embodiments, the processor 501 may be an Artificial Intelligence (AI) processor, which may be implemented as a Tensor Processing Unit (TPU), or a graphical processor unit, or a custom programmable solution Field-Programmable Gate Array (FPGA).

The computing system 500 may also include a memory 503 (main memory), for example, Random Access Memory (RAM) or other dynamic memory, for storing information and instructions to be executed by the processor 501. The memory 503 also may be used for storing temporary variables or other intermediate information during execution of instructions to be executed by the processor 501. The computing system 500 may likewise include a read only memory ("ROM") or other static storage device coupled to bus 502 for storing static information and instructions for the processor 501.

The computing system 500 may also include a storage device 504, which may include, for example, a media drives 505 and a removable storage interface. The media drive 505 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 506 may include, for example, a hard disk, magnetic tape, flash drive, or other fixed or removable medium that is read by and written to by the media drive 505. As these examples illustrate, the storage media 506 may include a computer-readable storage medium having stored there in particular computer software or data.

In alternative embodiments, the storage devices 504 may include other similar instrumentalities for allowing computer programs or other instructions or data to be loaded into the computing system 500. Such instrumentalities may include, for example, a removable storage unit 507 and a storage unit interface 508, such as a program cartridge and cartridge interface, a removable memory (for example, a flash memory or other removable memory module) and memory slot, and other removable storage units and interfaces that allow software and data to be transferred from the removable storage unit 507 to the computing system 500.

The computing system 500 may also include a communications interface 509. The communications interface 509 may be used to allow software and data to be transferred between the computing system 500 and external devices. Examples of the communications interface 509 may include a network interface (such as an Ethernet or other NIC card), a communications port (such as for example, a USB port, a micro USB port), Near field Communication (NFC), etc. Software and data transferred via the communications interface 509 are in the form of signals which may be electronic, electromagnetic, optical, or other signals capable of being received by the communications interface 509. These signals are provided to the communications interface 509 via a channel 510. The channel 510 may carry signals and may be implemented using a wireless medium, wire or cable, fiber optics, or other communications medium. Some examples of the channel 510 may include a phone line, a cellular phone link, an RF link, a Bluetooth link, a network interface, a local or wide area network, and other communications channels.

The computing system 500 may further include Input/Output (I/O) devices 511. Examples may include, but are not limited to a display, keypad, microphone, audio speakers, vibrating motor, LED lights, etc. The I/O devices 511 may receive input from a user and also display an output of the computation performed by the processor 501. In this document, the terms "computer program product" and "computer-readable medium" may be used generally to refer to media such as, for example, the memory 503, the storage devices 504, the removable storage unit 507, or signal(s) on the channel 510. These and other forms of computer-readable media may be involved in providing one or more sequences of one or more instructions to the processor 501 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into the computing system 500 using, for example, the removable storage unit 507, the media drive 505 or the communications interface 509. The control logic (in this example, software instructions or computer program code), when executed by the processor 501, causes the processor 501 to perform the functions of the invention as described herein.

Thus, the disclosed method and system try to overcome the technical problem of optimally fitting shapes in a 2D sheet. The method and system optimize placement of multiple copies of non-rectangular pieces on a rectangular sheet of raw material. Further, the method and system use a dual stage compaction algorithm to first form a compact unit and then repeat the compact unit by optimally calculating repeat intervals. Further, the method and system place multiple copies of a single part geometry on a sheet using sheet size and rotational intervals of one copy of the 2D shape relative to a stationary copy of the 2D shape as parameters to decide an optimal pair combination and the compact unit. Further, the method and system use sheet dimensions to select optimal choice to maximize sheet efficiency. Further, the method and system create multiple positional variations for a given orientation combination of the pair to provide a greater choice for selection the optimal pair.

As will be appreciated by those skilled in the art, the techniques described in the various embodiments discussed above are not routine, or conventional, or well understood in the art. The techniques discussed above provide for optimally fitting shapes in a 2D sheet. The techniques first receive discretized geometric data corresponding to a 2D shape of a part. The discretized geometric data includes a plurality of pixels corresponding to the 2D shape. The techniques then generate a pair of copies of the 2D shape including a first copy of the 2D shape at an initial first copy orientation and a second copy of the 2D shape at an initial second copy orientation using the discretized geometric data. The initial first copy orientation is one of a plurality of permissible first copy orientations and the initial second copy orientation is one of a plurality of permissible second copy orientations. For each of the plurality of permissible first copy orientations and each of the plurality of permissible second copy orientations, the techniques then determine an optimal arrangement of the first copy and the second copy on the 2D sheet to obtain an optimally arranged pair. The optimally arranged pair includes the first copy at a final first copy orientation and the second copy at a final second copy orientation. The final first copy orientation is one of a plurality of permissible first copy orientations and the final second copy orientation is one of a plurality of permissible second copy orientations. For each of a plurality of optimally arranged pairs, the techniques then generate a first copy of the pair and a second copy of the pair. The first copy of the pair is located at an initial distance apart from the second copy of the pair. For each of a plurality of optimally arranged pairs, the techniques then determine a pair combination with a minimum distance between the first copy of the pair and the second copy of the pair. The minimum distance includes a minimum part-to-part distance. For each of a plurality of optimally arranged pairs, the techniques then calculate a maximum number of repetitions possible for the pair combination on the 2D sheet based on sheet dimensions and a set of pair combination parameters. For each of a plurality of optimally arranged pairs, the techniques then identify an optimal pair combination from a plurality of pair combinations based on the maximum number of repetitions possible on the 2D sheet.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for optimally fitting shapes in a 2D sheet. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for optimally fitting shapes in a 2-Dimensional (2D) sheet, the method comprising:
   receiving, by a nesting device, discretized geometric data corresponding to a 2D shape of a part, wherein the discretized geometric data comprises a plurality of pixels corresponding to the 2D shape;
   generating, by the nesting device, a pair of copies of the 2D shape comprising a first copy of the 2D shape at an initial first copy orientation and a second copy of the 2D shape at an initial second copy orientation using the discretized geometric data, wherein the initial first copy orientation is one of a plurality of permissible first copy orientations and the initial second copy orientation is one of a plurality of permissible second copy orientations;
   for each of the plurality of permissible first copy orientations and each of the plurality of permissible second copy orientations,
      determining, by the nesting device, an optimal arrangement of the first copy and the second copy on the 2D sheet to obtain an optimally arranged pair, wherein determining the optimal arrangement of the first copy and the second copy comprises, for each of the plurality of permissible second copy orientations of the second copy, revolving the second copy around the first copy based on a constant predefined rotational variable at discrete predefined intervals, wherein the first copy is fixed at the initial first copy orientation, and wherein the optimally arranged pair comprises the first copy at a final first copy orientation and the second copy at a final second copy orientation, and wherein the final first copy orientation is one of the plurality of permissible first copy orientations and the final second copy orientation is one of the plurality of permissible second copy orientations;

for each of a plurality of optimally arranged pairs, generating, by the nesting device, a first copy of the optimally arranged pair and a second copy of the optimally arranged pair, wherein the first copy of the optimally arranged pair is located at an initial distance apart from the second copy of the optimally arranged pair;

determining, by the nesting device, a pair combination with a minimum distance between the first copy of the optimally arranged pair and the second copy of the optimally arranged pair, wherein the minimum distance comprises a minimum part-to-part distance;

calculating, by the nesting device, a maximum number of repetitions possible for the pair combination on the 2D sheet based on sheet dimensions and a set of pair combination parameters; and identifying, by the nesting device, an optimal pair combination from a plurality of pair combinations based on the maximum number of repetitions possible on the 2D sheet.

2. The method of claim 1, wherein identifying the optimal pair combination from the plurality of pair combinations further comprises:

for each of at least two optimal pair combinations with identical maximum number of repetitions possible, calculating a continuous remnant on the 2D sheet for the optimal pair combination with the maximum number of repetitions possible; and selecting the optimal pair combination from the at least two optimal pair combinations based on the continuous remnant on the 2D sheet, wherein the continuous remnant on the 2D sheet for the selected optimal pair combination is highest among the at least two optimal pair combinations.

3. The method of claim 1, wherein the set of pair combination parameters comprises geometry of the 2D shape, orientation of the first copy and the second copy in the optimally arranged pair, and the minimum part-to-part distance.

4. The method of claim 1, further comprising, for each of the plurality of permissible second copy orientations of the second copy, identifying, by the nesting device, at least one intersecting region between the first copy and the second copy in the 2D sheet.

5. The method of claim 1, wherein the initial distance that sets apart the first copy of the optimally arranged pair and the second copy of the optimally arranged pair comprises an initial horizontal distance and an initial vertical distance.

6. The method of claim 5, wherein determining the minimum distance between the first copy of the pair and the second copy of the pair comprises:

reducing the initial horizontal distance between the first copy of the pair and the second copy of the pair by predefined horizontal distance intervals to obtain a minimum part-to-part distance between the first copy of the optimally arranged pair and the second copy of the optimally arranged pair, wherein the first copy of the optimally arranged pair is not intersecting with the second copy of the optimally arranged pair at the minimum part-to-part distance;

reducing the initial vertical distance between the first copy of the optimally arranged pair and the second copy of the optimally arranged pair by predefined vertical distance intervals to obtain a minimum part-to-part distance between the first copy of the optimally arranged pair and the second copy of the optimally arranged pair, wherein the first copy of the optimally arranged pair is not intersecting with the second copy of the optimally arranged pair at the minimum part-to-part distance; and determining the minimum distance between the first copy of the pair and the second copy of the pair based on the minimum part-to-part distance.

7. The method of claim 1, further comprising generating the discretized geometric data from the 2D shape of the part.

8. A system for optimally fitting shapes in a 2-Dimensional (2D) sheet, the system comprising:

a processor; and a memory communicatively coupled to the processor, wherein the memory stores processor instructions, which when executed by the processor, cause the processor to:

receive discretized geometric data corresponding to a 2D shape of a part, wherein the discretized geometric data comprises a plurality of pixels corresponding to the 2D shape;

generate a pair of copies of the 2D shape comprising a first copy of the 2D shape at an initial first copy orientation and a second copy of the 2D shape at an initial second copy orientation using the discretized geometric data, wherein the initial first copy orientation is one of a plurality of permissible first copy orientations and the initial second copy orientation is one of a plurality of permissible second copy orientations;

for each of the plurality of permissible first copy orientations and each of the plurality of permissible second copy orientations, determine an optimal arrangement of the first copy and the second copy on the 2D sheet to obtain an optimally arranged pair, wherein determining the optimal arrangement of the first copy and the second copy comprises, for each of the plurality of permissible second copy orientations of the second copy, revolving the second copy around the first copy based on a constant predefined rotational variable at discrete predefined intervals, wherein the first copy is fixed at the initial first copy orientation, and wherein the optimally arranged pair comprises the first copy at a final first copy orientation and the second copy at a final second copy orientation, and wherein the final first copy orientation is one of a plurality of permissible first copy orientations and the final second copy orientation is one of a plurality of permissible second copy orientations;

for each of a plurality of optimally arranged pairs, generate a first copy of the optimally arranged pair and a second copy of the optimally arranged pair, wherein the first copy of the optimally arranged pair is located at an initial distance apart from the second copy of the optimally arranged pair;

determine a pair combination with a minimum distance between the first copy of the optimally arranged pair and the second copy of the optimally arranged pair, wherein the minimum distance comprises a minimum part-to-part distance;

calculate a maximum number of repetitions possible for the pair combination on the 2D sheet based on sheet dimensions and a set of pair combination parameters; and identify an optimal pair combination from a plurality of pair combinations based on the maximum number of repetitions possible on the 2D sheet.

9. The system of claim 8, wherein to identify an optimal pair combination from the plurality of pair combinations, the processor instructions, on execution, further cause the processor to:

for each of at least two optimal pair combinations with identical maximum number of repetitions possible, calculate a continuous remnant on the 2D sheet for the optimal pair combination with the maximum number of repetitions possible; and select the optimal pair combination from the at least two optimal pair combinations based on the continuous remnant on the 2D sheet, wherein the continuous remnant on the 2D sheet for the selected optimal pair combination is highest among the at least two optimal pair combinations.

10. The system of claim 8, wherein the set of pair combination parameters comprises geometry of the 2D shape, orientation of the first copy and the second copy in the optimally arranged pair, and the minimum part-to-part distance.

11. The system of claim 8, wherein, for each of the plurality of permissible second copy orientations of the second copy, the processor instructions, on execution, further cause the processor to identify at least one intersecting region between the first copy and the second copy in the 2D sheet.

12. The system of claim 8, wherein the initial distance that sets apart the first copy of the optimally arranged pair and the second copy of the optimally arranged pair comprises an initial horizontal distance and an initial vertical distance.

13. The system of claim 12, wherein to determine the minimum distance between the first copy of the optimally arranged pair and the second copy of the optimally arranged pair, the processor instructions, on execution, cause the processor to:

reduce the initial horizontal distance between the first copy of the optimally arranged pair and the second copy of the optimally arranged pair by predefined horizontal distance intervals to obtain a minimum part-to-part distance between the first copy of the optimally arranged pair and the second copy of the optimally arranged pair, wherein the first copy of the optimally arranged pair is not intersecting with the second copy of the optimally arranged pair at the minimum part-to-part distance;

reduce the initial vertical distance between the first copy of the optimally arranged pair and the second copy of the optimally arranged pair by predefined vertical distance intervals to obtain a minimum part-to-part distance between the first copy of the optimally arranged pair and the second copy of the optimally arranged pair, wherein the first copy of the optimally arranged pair is not intersecting with the second copy of the optimally arranged pair at the minimum part-to-part distance; and determine the minimum distance between the first copy of the optimally arranged pair and the second copy of the optimally arranged pair based on the minimum part-to-part distance.

14. The system of claim 8, wherein the processor instruction, on execution, further cause the processor to generate the discretized geometric data from the 2D shape of the part.

15. A non-transitory computer-readable medium storing computer-executable instructions for optimally fitting shapes in a 2-Dimensional (2D) sheet, the computer-executable instructions configured for:

receiving discretized geometric data corresponding to a 2D shape of a part, wherein the discretized geometric data comprises a plurality of pixels corresponding to the 2D shape;

generating a pair of copies of the 2D shape comprising a first copy of the 2D shape at an initial first copy orientation and a second copy of the 2D shape at an initial second copy orientation using the discretized geometric data, wherein the initial first copy orientation is one of a plurality of permissible first copy orientations and the initial second copy orientation is one of a plurality of permissible second copy orientations;

for each of the plurality of permissible first copy orientations and each of the plurality of permissible second copy orientations, determining an optimal arrangement of the first copy and the second copy on the 2D sheet to obtain an optimally arranged pair, wherein determining the optimal arrangement of the first copy and the second copy comprises, for each of the plurality of permissible second copy orientations of the second copy, revolving the second copy around the first copy based on a constant predefined rotational variable at discrete predefined intervals, wherein the first copy is fixed at the initial first copy orientation, and wherein the optimally arranged pair comprises the first copy at a final first copy orientation and the second copy at a final second copy orientation, and wherein the final first copy orientation is one of the plurality of permissible first copy orientations and the final second copy orientation is one of the plurality of permissible second copy orientations;

for each of the plurality of optimally arranged pairs, generating a first copy of the optimally arranged pair and a second copy of the optimally arranged pair, wherein the first copy of the optimally arranged pair is located at an initial distance apart from the second copy of the optimally arranged pair;

determining a pair combination with a minimum distance between the first copy of the optimally arranged pair and the second copy of the optimally arranged pair, wherein the minimum distance comprises a minimum part-to-part distance;

calculating a maximum number of repetitions possible for the pair combination on the 2D sheet based on sheet dimensions and a set of pair combination parameters; and identifying an optimal pair combination from a plurality of pair combinations based on the maximum number of repetitions possible on the 2D sheet.

16. The non-transitory computer-readable medium of claim 15, wherein to identify the optimal pair combination from the plurality of pair combinations, the computer-executable instructions are further configured for:

for each of at least two optimal pair combinations with identical maximum number of repetitions possible, calculating a continuous remnant on the 2D sheet for the optimal pair combination with the maximum number of repetitions possible; and selecting the optimal pair combination from the at least two optimal pair combinations based on the continuous remnant on the 2D sheet, wherein the continuous remnant on the 2D sheet for the selected optimal pair combination is highest among the at least two optimal pair combinations.

17. The non-transitory computer-readable medium of claim 15, wherein the initial distance that sets apart the first copy of the optimally arranged pair and the second copy of the optimally arranged pair comprises an initial horizontal distance and an initial vertical distance.

18. The non-transitory computer-readable medium of claim 17, wherein to determine the minimum distance between the first copy of the optimally arranged pair and the second copy of the optimally arranged pair, the computer-executable instructions are configured for:

reducing the initial horizontal distance between the first copy of the optimally arranged pair and the second copy of the optimally arranged pair by predefined horizontal distance intervals to obtain a minimum part-to-part distance between the first copy of the optimally arranged pair and the second copy of the optimally arranged pair, wherein the first copy of the optimally arranged pair is not intersecting with the second copy of the optimally arranged pair at the minimum part-to-part distance;

reducing the initial vertical distance between the first copy of the optimally arranged pair and the second copy of the optimally arranged pair by predefined vertical distance intervals to obtain a minimum part-to-part distance between the first copy of the optimally arranged pair and the second copy of the optimally arranged pair, wherein the first copy of the optimally arranged pair is not intersecting with the second copy of the optimally arranged pair at the minimum part-to-part distance; and determining the minimum distance between the first copy of the optimally arranged pair and the second copy of the optimally arranged pair based on the minimum part-to-part distance.

* * * * *